United States Patent
Crawford (10) Patent No.: US 8,617,643 B2
(45) Date of Patent: Dec. 31, 2013

(54) REPROGRAMMABLE PARALLEL NANOMANUFACTURING

(75) Inventor: Thomas M. Crawford, Irmo, SC (US)

(73) Assignee: University of South Carolina, Columbia, SC (US)

(*) Notice: Subject to any disclaimer, the term of this patent is extended or adjusted under 35 U.S.C. 154(b) by 814 days.

(21) Appl. No.: 12/376,646

(22) PCT Filed: Oct. 1, 2007

(86) PCT No.: PCT/US2007/080080
§ 371 (c)(1),
(2), (4) Date: Jun. 10, 2010

(87) PCT Pub. No.: WO2008/118191
PCT Pub. Date: Oct. 2, 2008

(65) Prior Publication Data
US 2010/0279024 A1    Nov. 4, 2010

Related U.S. Application Data

(60) Provisional application No. 60/848,155, filed on Sep. 29, 2006.

(51) Int. Cl.
*B05D 5/12*    (2006.01)
(52) U.S. Cl.
USPC ............ 427/128; 427/508; 427/547; 427/548
(58) Field of Classification Search
USPC ................................. 427/128, 508, 547, 548
See application file for complete search history.

(56) References Cited

U.S. PATENT DOCUMENTS

| 4,529,621 | A * | 7/1985 | Ballard .............................. 438/3 |
| 6,821,596 | B2 | 11/2004 | Terao et al. |
| 2005/0238967 | A1 | 10/2005 | Rogers et al. |
| 2005/0239948 | A1 * | 10/2005 | Haik et al. .................... 524/496 |
| 2005/0249667 | A1 | 11/2005 | Tuszynski et al. |
| 2006/0003152 | A1 | 1/2006 | Youngs |
| 2007/0202403 | A1 * | 8/2007 | Oh et al. ....................... 429/217 |
| 2007/0237987 | A1 * | 10/2007 | Winarski .................. 428/836.3 |

OTHER PUBLICATIONS

Shi et al. "A General Approach to Binary and Ternary Hybrid Nanocrystals" Nano Letters 2006 vol. 6, No. 4, 875-881.*
Zhu et al. "Well-Aligned Open-Ended Carbon Nanotube Architectures: An Approach for Device Assembly" vol. 6, No. 2, 243-247.*
Terris et al. "Nanofabricated and Self-Assembled Magnetic Structures as Data Storage Media" J. Phys. D: Appl. Phys. 38 (2005) R199-R222.*

(Continued)

*Primary Examiner* — Robert S Walters, Jr.
(74) *Attorney, Agent, or Firm* — Dority & Manning, P.A.

(57) ABSTRACT

A method of producing a nanoscale structure having substantially immobilized nanoparticles arranged at a predetermined patterned is generally disclosed. First, a curable polymeric solution is placed within a well defined by a wafer. The curable polymeric solution includes a curable polymeric material and a magnetically coated nanoparticle. The well is positioned adjacent to an atomically-smooth medium. A recording head is moved in a predetermined manner to produce a magnetic field profile that substantially immobilizes the magnetically coated nanoparticle within the curable polymeric solution in the well. The curable polymeric solution is cured such that the magnetically coated nanoparticle remains substantially immobilized after the magnetic field profile is removed.

17 Claims, 8 Drawing Sheets

(56) References Cited

OTHER PUBLICATIONS

Gokemeijer, et al., Recording head metrology at sub-100 nm device dimensions. Journal of *Applied Physics*, 2005. 97: p. 083912.

Gokemeijer, et al., Direct measurement of the field from a magnetic recording head using an InAs hall sensor on a contact write/read tester. Journal of Magnetism and Magnetic Materials, 2005. 290-291: p. 254.

Gokemeijer, et al., Write field measurements of a perpendicular head on a soft underlayer film. IEEE Transactions on Magnetics, 2006. 42: p. 163.

Leonhardt, et al., Comparison of perpendicular and longitudinal magnetic recording using a contact write/read tester. IEEE Trans. Magn., 2001. 37(4): p. 1580.

Lohau, et al., Dynamic coercivity measurements of antiferromagnetically coupled magnetic media layers. Appl. Phys. Lett., 2001. 78(18): p. 2748.

Moser, et al., Dynamic coercivity measurements in thin film recording media using a contact write/read tester. J. Appl. Phys., 1999. 85(8): p. 5018.

Schrag, et al., Submicron electrical current density imaging of embedded microstructures. Appl. Phys. Lett., 2003. 82(19): p. 3272.

Yammamoto et al., Scanning magnetoresistance microscopy (SMRM): Imaging with a MR head. J. Appl. Phys., 1997. 81(8): p. 4696.

\* cited by examiner

REPROGRAMMABLE PARALLEL NANOMANUFACTURING

PRIORITY INFORMATION

The present application claims priority to the U.S. Provisional Patent Application No. 60/848,155 filed on Sep. 29, 2006, naming Thomas M. Crawford as the inventor, the entire disclosure of which is hereby incorporated by reference.

BACKGROUND OF THE INVENTION

One of the key challenges to successful nanomanufacturing is the discovery of a means to assemble nanoscale objects into controlled, user-defined patterns for lower cost and capital investment than current microelectronic assembly technologies. While self-assembly techniques can make largely (although not perfect) regular arrays of nanostructures, programming the local nanoscale assembly process in a reliable and cost effective manner, and then putting these locally-assembled pieces into a bigger macroscale structure has yet to be realized as a potential manufacturing technology. Alternative lithography techniques have obtained nanoscale resolution, but still employ top-down or subtractive processing. There have been efforts to trap small particles with magnetic fields. However, to date, these solutions have employed patterned magnetic materials which are in set configurations, i.e. they are not locally reprogrammable into arbitrary patterns.

As such, a need currently exists for a programmable local nanoscale assembly process which can be further assembled into a larger macroscale structure.

SUMMARY OF INVENTION

Objects and advantages of the invention will be set forth in part in the following description, or may be obvious from the description, or may be learned through practice of the invention.

The present invention is generally directed to a nanomanufacturing technology for customizable, reprogrammable, local assembly of nanostructures. This technology employs magnetic recording heads to pattern a magnetic media. The stray fields from the media immobilize nanostructures into programmable arrays, and these assembled nanostructure sub-components are then assembled into macroscale structures by robotic pick and place transfer. This technology may be implemented for single component assembly, or by fabricating many sub-components in parallel with macro assembly in blocks. Using soft lithographic techniques, these arrays are inked onto stamps which robotically place them onto a final device substrate to manufacture a hierarchical, 3D multilayer structure.

For example, in one embodiment, a method of producing a nanoscale structure having substantially immobilized nanoparticles arranged at a pre-determined patterned is generally disclosed. First, a curable polymeric solution is placed within a well defined by a wafer. The curable polymeric solution includes a curable polymeric material and a magnetically coated nanoparticle. The well is positioned adjacent to an atomically-smooth medium. A recording head is moved in a predetermined manner (e.g., controlled by a computer program) to produce a magnetic field profile that substantially immobilizes the magnetically coated nanoparticle within the curable polymeric solution in the well. The curable polymeric solution is cured such that the magnetically coated nanoparticle remains substantially immobilized after the magnetic field profile is removed.

Other features and aspects of the present invention are discussed in greater detail below.

BRIEF DESCRIPTION OF THE FIGURES

A full and enabling disclosure of the present invention, including the best mode thereof to one skilled in the art, is set forth more particularly in the remainder of the specification, which includes reference to the accompanying figures, in which.

Repeat use of reference characters in the present specification and drawings is intended to represent the same or analogous features or elements of the present invention.

DETAILED DESCRIPTION OF THE INVENTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Generally speaking, the present invention is directed to a user-controllable, additive (i.e. bottom-up) technology for making programmable nanoscale structures that can be assembled into a macroscale structure. One advantage of the presently disclosed methods is that commercially-available magnetic recording technology can be employed in a contact write/read tester to program and control the local assembly of nanostructured components. Suitable magnetic recording technology employing a contact write/read tester and the apparatus involved in such technology is known in the art and further described in N.J. Gokemeijer, T. W. Clinton, T. M. Crawford, and M. Johnson, Recording head metrology at sub-100 nm device dimensions. Journal of Applied Physics, 2005. 97: p. 083912; N.J. Gokemeijer, T. W. Clinton, T. M. Crawford, and M. Johnson, Direct measurement of the field from a magnetic recording head using an InAs hall sensor on a contact write/read tester. Journal of Magnetism and Magnetic Materials, 2005. 290-291: p. 254; N.J. Gokemeijer, A. K. Langzettel, and M. Covington, Write field measurements of a perpendicular head on a soft underlayer film. IEEE Transactions on Magnetics, 2006. 42: p. 163; T. D. Leonhardt, R. J. M. v.d. Veerdonk, P. A. A. v.d. Heijden, T. W. Clinton, and T. M. Crawford, Comparison of perpendicular and longitudinal magnetic recording using a contact write/read tester. IEEE Trans. Magn., 2001. 37(4): p. 1580; J. Lohau, A. Moser, D. T. Margulies, E. E. Fullerton, and M. E. Schabes, Dynamic coercivity measurements of antiferromagnetically coupled magnetic media layers. Appl. Phys. Lett., 2001. 78(18): p. 2748; A. Moser, D. Weller, M. E. Best, and M. F. Doerner, Dynamic coercivity measurements in thin film recording media using a contact write/read tester. J. Appl. Phys., 1999. 85(8): p. 5018; B. D. Schrag and G. Xiao, Submicron electrical current density imaging of embedded microstructures. Appl. Phys. Lett., 2003. 82(19): p. 3272; and S. Y. Yammamoto and S. Shultz, Scanning magnetoresistance microscopy (SMRM): Imaging with a MR head. J. Appl. Phys., 1997. 81(8): p. 4696, the disclosures of which are incorporated by reference herein to the extent that they are not inconstant with the present disclosure.

When combined with soft lithographic transfer techniques to assemble these local nanostructures into 3D macroscale objects, this technology can be employed for nanomanufacturing. Because it can use commercial magnetic recording technology, nanoscale resolution is obtained for very low cost. Moreover, because the assembly platform is reusable, the overall cost management structure should be economically viable for nanomanufacturing with significantly lower total capital investment than for conventional microelectronic fabrication techniques.

Magnetic Recording

Figure 1:
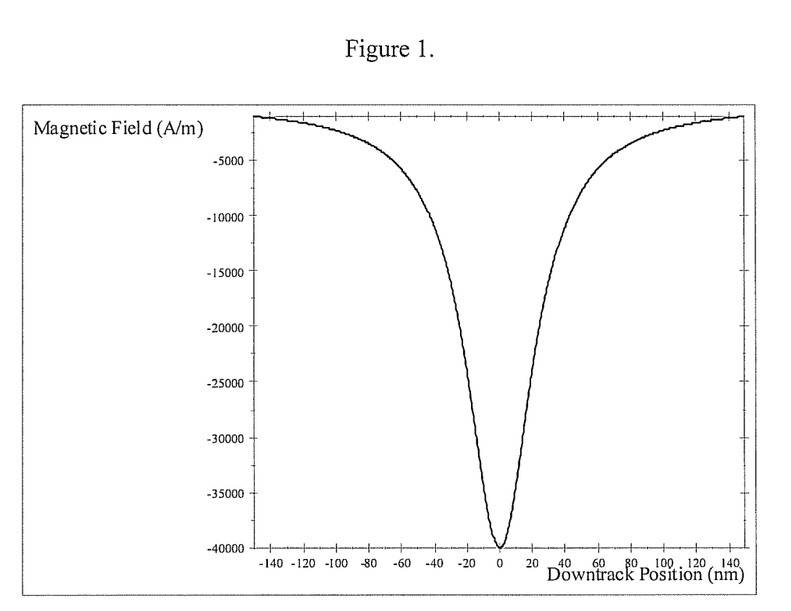
FIG. 1 shows fields of a longitudinal recording transition, where "a" parameter was 10 nm; the medium spacing was 15 nm; and the Mr=310 emu/cc (300 kA/m).

In conventional magnetic recording, a magnetic head flies at heights of less than about 10 nm, over an atomically-smooth medium comprised of less than about 10 nm-sized grains of a cobalt (Co) alloy medium. A nano-sized electromagnet, known as the write head or writer, is energized via an electric current such that the poles of the electromagnet emit a strong magnetic field. This field aligns the Co alloy grains in the direction of the applied field. When the current is reversed, the grains are aligned in the opposite direction. The region on the medium where the oppositely directed grains meet, known as a transition, emits a stray magnetic field, with its orientation (up or down) depending on whether the north or south poles of the grains meet in this region. This stray magnetic field emanates from a spatial region of the media which is on the order of the grain size, e.g., less than about 10 nm for present magnetic recording technology. Mathematically, the field is given by the following expression, $$H_y = \frac{M_r}{2\pi} \ln\left(\frac{\left(a+y-\frac{\delta}{2}\right)^2 + x^2}{\left(a+y+\frac{\delta}{2}\right)^2 + x^2}\right),$$

where $M_r$ is the remanent magnetization, a is the transition parameter, y is the height above the media, and x is the distance away from the transition laterally. FIG. 1 shows a plot of the magnetic field in the vicinity of a transition, calculated using this formula for $M_r=310$ emu/cc, a=10 nm, and y=15 nm. These media properties are those that would be found at recording areal densities of 100 Gbit/in$^2$. Current longitudinal technology has evolved past this value, and so materials with these parameters are obtainable as production components. The spatial confinement of this field decreases with distance, and at the standard heights at which the head is flying, and for finite resolution magnetic sensors, the obtained transition width broadens to about 50 nm. The magnitude of this field can be as high as 500 Oe, which is sufficient to induce a moment in a magnetic material such as superparamagnetic Fe3O4 particles. In a uniform magnetic field, the nanoparticle moment would attempt to rotate partially into alignment with the field. However, the field created by the media stray field is spatially nonuniform. This nonuniform field, therefore, exerts a force on the particle, given by $$\vec{F} = \vec{\nabla}(\vec{m} \cdot \vec{B}).$$

Figure 2:
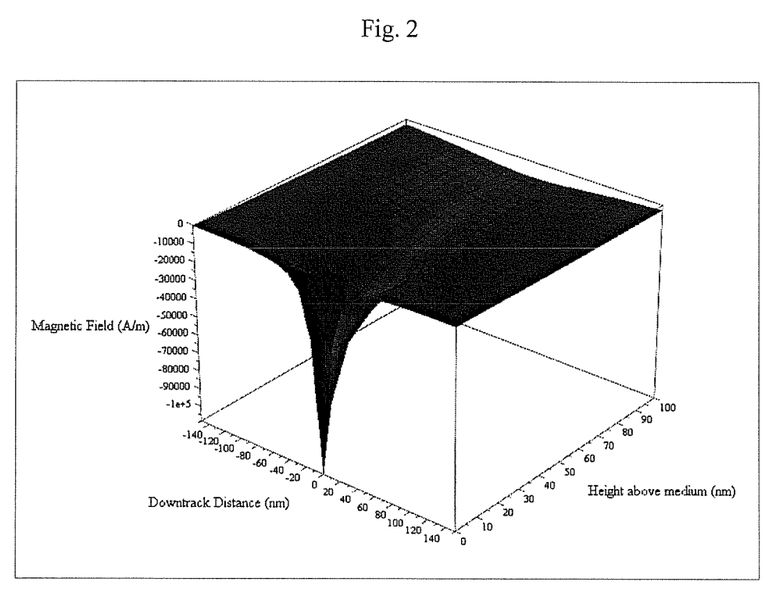
FIG. 2 shows what this magnetic field looks like as a function of height above the medium as well as down track, where "a" parameter was 10 nm; the medium spacing was 15 nm; and the Mr=310 emu/cc (300 kA/m).
Figure 3:
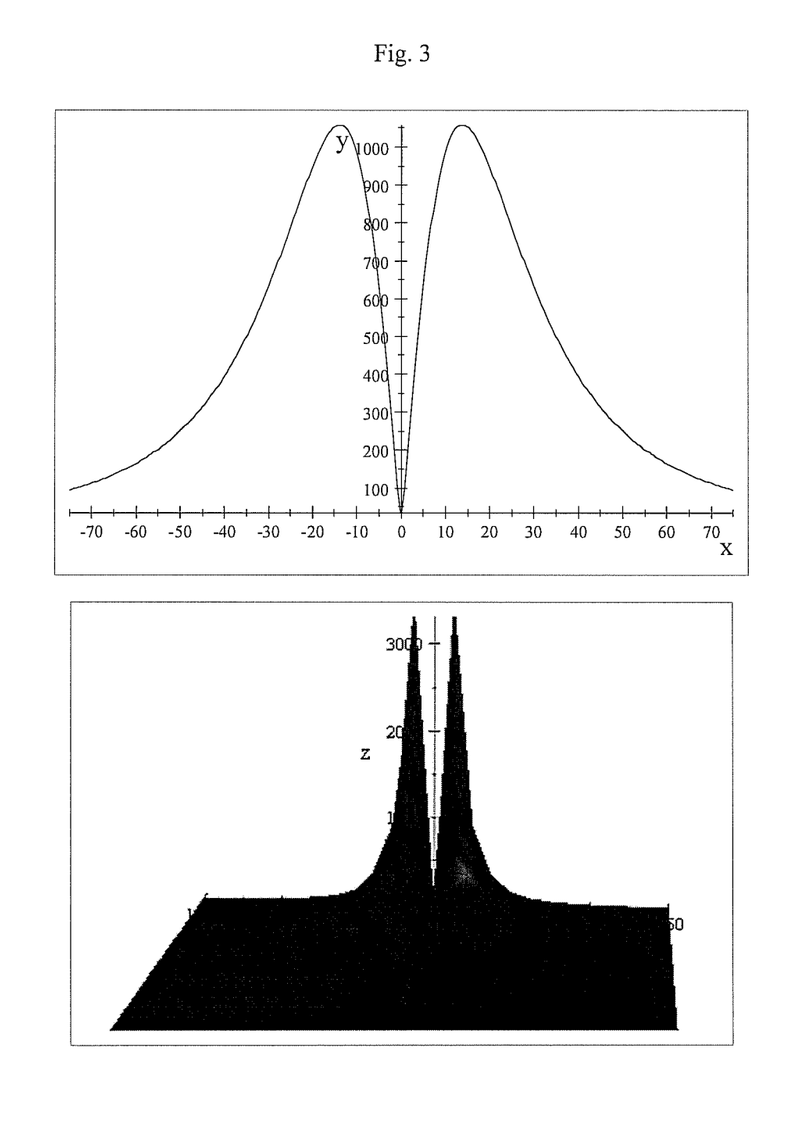
FIG. 3 shows the magnetic field gradient of the y-directed field as a function of x, in two and three dimensions, where "a" parameter was 10 nm; the medium spacing was 15 nm; and the Mr=310 emu/cc (300 kA/m).

This force will try to pull the particle into the region of strongest field, as it depends on the gradient of field component along the direction of m, scaled by the moment magnitude. FIG. 2 shows what this magnetic field looks like as a function of height above the medium as well as down track. FIG. 3 shows the gradient of the y-directed field as a function of x, in two and three dimensions. The gradient increases until the particle is in the center, and then it decreases, effectively "trapping" the magnetic particle in the deep well centered at the maximum field. These graphs show how a spatially-localized and nonuniform magnetic field can "trap" a magnetic particle in hold it in one place.

In general, magnetically-recorded patterns of this type will alternate in field direction. However, a negative field will induce a moment in a superparamagnetic nanoparticle such that it will be attracted to the region of strongest negative field similar to an adjacent transition of strong positive field. In other words, the magnetic moment of the nanostructure may take either direction and will still be attracted, i.e. the force is "uniaxial". For reasonable transition separations, the induced moment would be such that it would be repelled from adjacent transitions of oppositely directed fields, enhancing the ability of a local transition to magnetize and trap nanoparticles. In addition to in-plane magnetized magnetic media, it is also possible to have magnetic media with a magnetization perpendicular to the plane. Such a media would offer the ability to change the size of the spatial region in which the nanoparticle is trapped, and having both types of media could offer an advantage in terms of flexibility of nanoparticle assembly.

A specific device is disclosed and described herein for the trap structure, which must satisfy several critical design requirements. To magnetically record the magnetic media, the write head must be within a certain distance of the media, typically less than about 25 nm and in advanced devices, less than about 10 nm. This has been demonstrated using recording heads in contact with media surfaces by correctly measuring the parameters expected for the component part performance. However, in order to have sufficiently large and spatially-localized trapping fields, the nanoparticles must be similarly close to the media. These requirements together suggest employing a supported membrane structure fabricated using conventional MEMS technology, as shown in FIGS. 4-5.

Supported Membrane Structure (Using MEMS Technology)

Figure 4A:
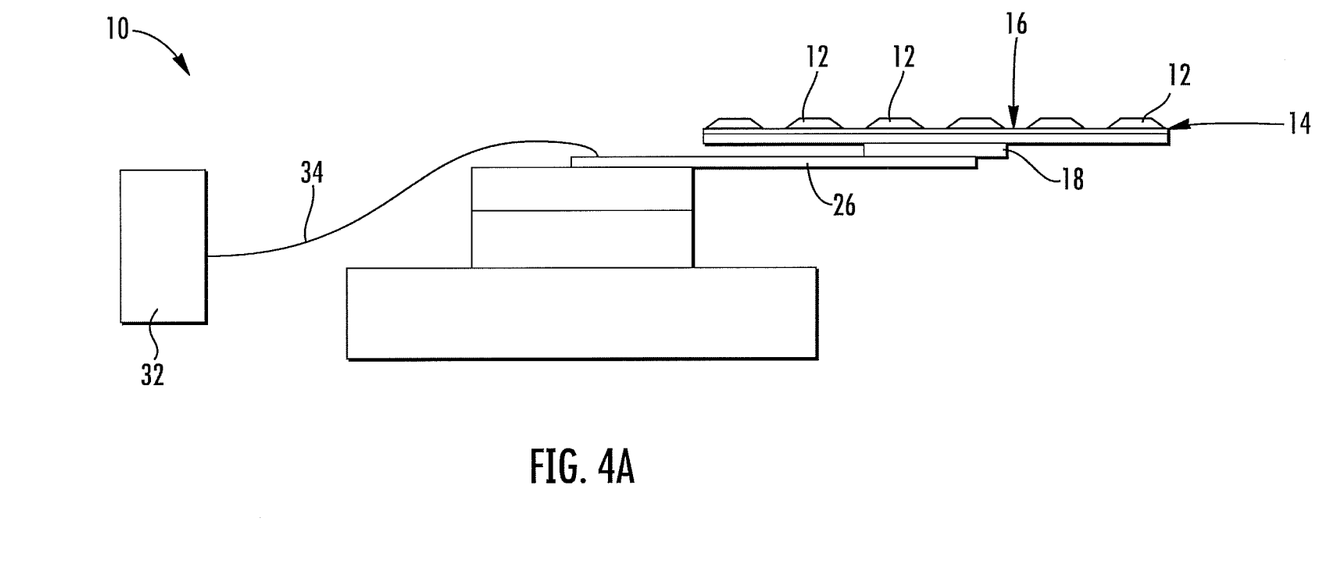
FIGS. 4A and 4B show a large scale side schematic of a nanostructure assembly tool.
Figure 4B:
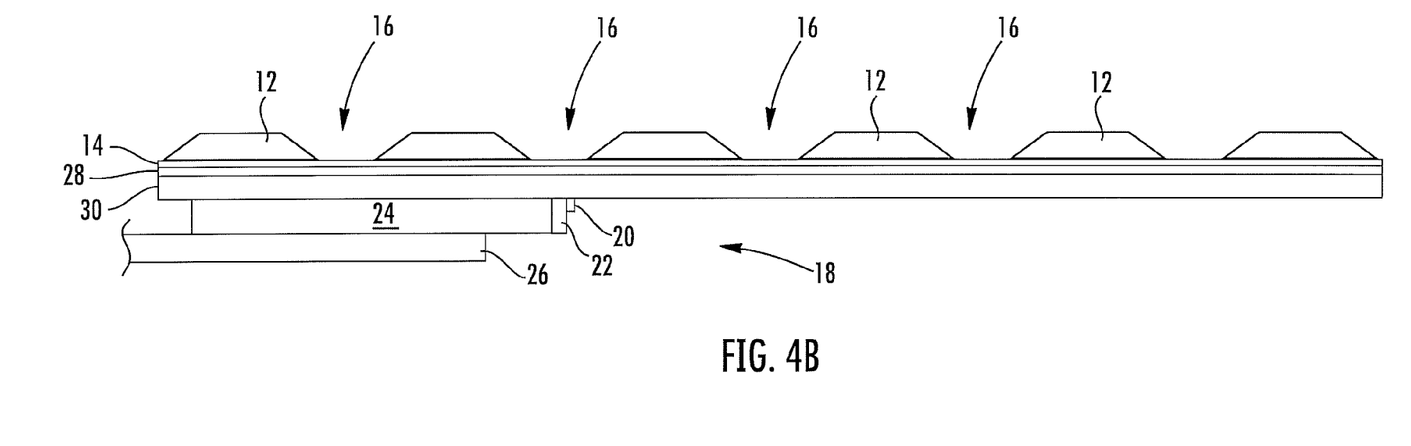
Figure 5:
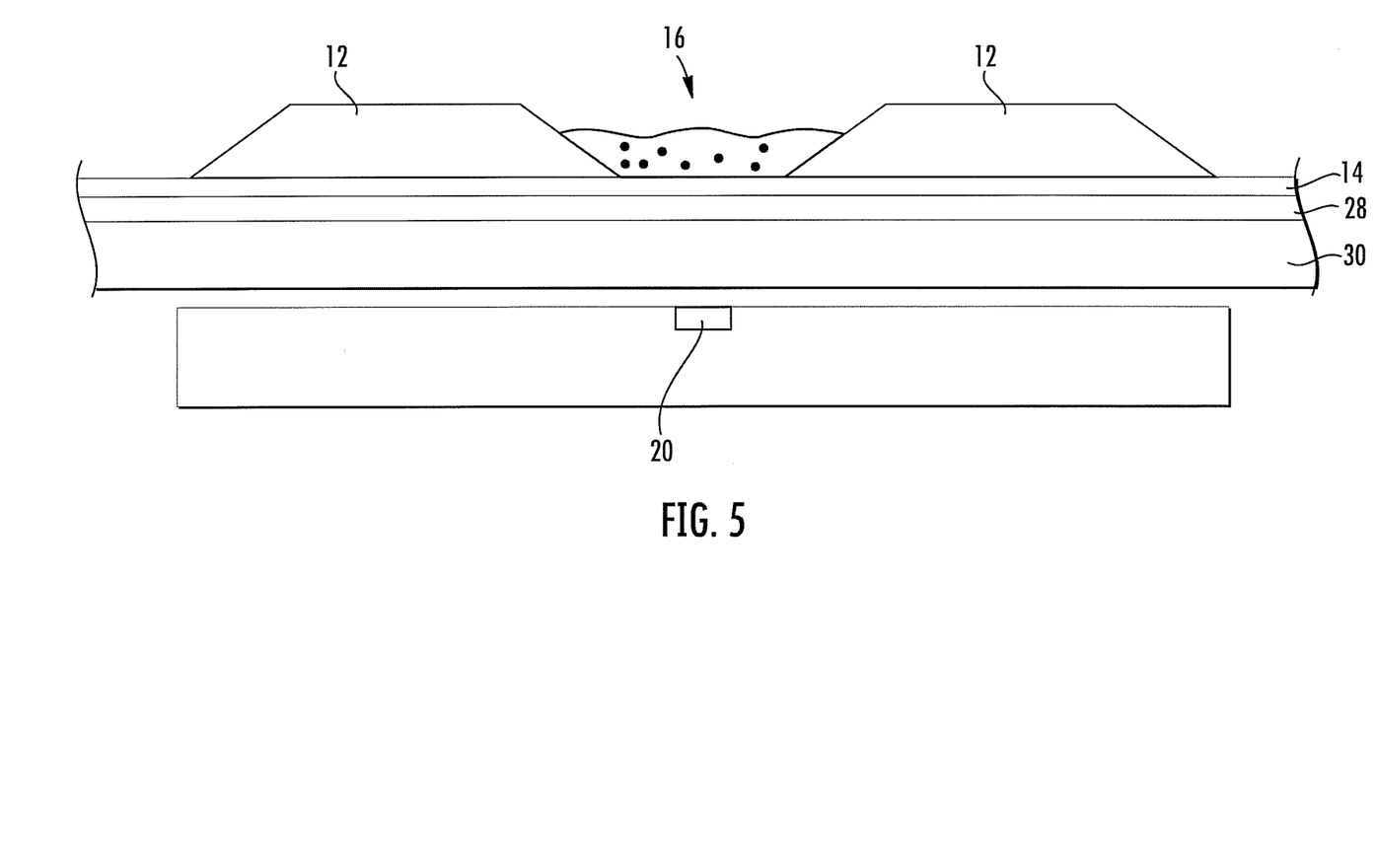
FIG. 5 shows a close-up front view of a single well etched into the Si wafer, showing just the $Si_3N_4$ membrane and the Co alloy media.

FIG. 4A shows a larger scale side schematic of the nanostructure assembly tool 10, and FIG. 4B shows a closeup of the recording head assembly. A silicon wafer 12 is shown which has been polished on two sides and coated on one side with a thin (about 15 nm) $Si_3N_4$ (silicon-nitride) membrane 14. On top of the membrane, a magnetic alloy film is deposited using sputter deposition, onto a seed layer (1-2 nm) as necessary to provide the correct texture for the film. Using conventional optical photolithography, the non-membrane covered side of the wafer is patterned to open about 10 micron wells 16 in the silicon. These wells 16 are etched into the silicon using either a wet etch (such as HF or KOH), or using reactive ion etching (RIE). These etches are selective in that they do not etch the $Si_3N_4$ membrane. Once the windows are open, it should be obvious that both sides of the media are within about 15 nm of an open surface. One skilled in the art will recognize that these wells 16 could be arrayed in an XY configuration, or along a single line, say Y, as necessary to achieve the required stability. Moreover, the final window size could be altered to achieve a desired "die" size for the nanostructures, and as needed for membrane stability and XY stage precision. For example, the window sizes can be up to about 100 microns, such as from about 1 micron to about 50 microns, or from about 5 microns to about 20 microns.

As indicated in FIG. 4, the recording head 18, also known as a head-gimbal assembly (HGA), is brought into physical contact with the unetched side of the silicon wafer. The HGA is attached to a 5 axis precision motion stage. This stage has a z-stage which brings the HGA into physical contact with the silicon wafer structure. The coarse XY stage aligns the transducer with the particular window being addressed. The XY piezo stage provides nanometer accuracy positioning of the transducer within a single window to encode the transitions which will trap the nanostructures. FIGS. 4A and 4B shows these components schematically as part of a contact write/read tester. Electronics are included to drive a current through the writer and encode the transitions and to power the readback sensor so the pattern can be verified against the designed pattern, as well as to move and position the stages, etc. The entire assembly tool can be computer-controlled.

More specifically, the recording head 18 includes a slider 24 movably placed on a suspension 26. The slider 24 is connected to an aluminum oxide ($Al_2O_3$) spacer 22 and a tranducer 20. The entire recording head apparatus is placed below the cobalt alloy media 30 which underlies the seed layer 28 and the silicon nitride membrane 14. The silicon wafer 12 having wells 16 etched into its surface is arranged on the silicon nitride membrane.

A computer 32 can control the movement of the recording head 18 on the suspension 26 through cable 34. Thus, the movement of the recording head can be controlled via a computer program. The computer program can be written to position the recording head 18 in any area, such that a nearly infinite number of patterns of magnetic field profiles can be applied to the window well 16.

In each well on the silicon wafer, fluid is dropped into the window in order to produce the nanoscale structure. The fluid includes superparamagnetic coated nanoparticles and a curable polymeric material. Superparamagnetic magnetic coatings for nanoparticles are known in the art and include iron oxide coatings ($Fe_3O_4$). However, any superparamagnetic magnetic coating can be utilized with the present disclosure. Likewise, any suitable nanoparticle can be used in conjunction with the present disclosure. Particularly suitable nanoparticles include gold and silver nanoparticles. Other suitable nanoparticles include nanowires (e.g., semiconductor nanowires) and nanorods (e.g., carbon nanotubes).

The curable polymeric material is curable to form a gel-like solid structure after curing. The curable polymeric material can include monomers and/or polymers prior to curing. Thus, when in a liquid stage for dropping into each well 16 of the silicon wafer 12, the polymeric solution remains in liquid form. In one embodiment, a photoinitiator can be also included in the polymeric solution in order to initiate curing upon the application of ultraviolet light. Likewise, a solvent may be present in the polymeric solution in order to keep the polymeric solution in liquid form during the initial stages.

FIG. 5 shows a close-up view of a single well etched into the Si wafer. The transducer 20 is shown centered on the window, and a drop of fluid containing nanostructures is shown to provide a reference for where the structures would be placed. In this example, nanostructures, for example, gold or silver nanoparticles, which have been coated with superparamagnetic iron oxide ($Fe_3O_4$), are loaded into a monomer solution containing a photoinitiator.

Programmable Magnetic Field Profile

Figure 6:
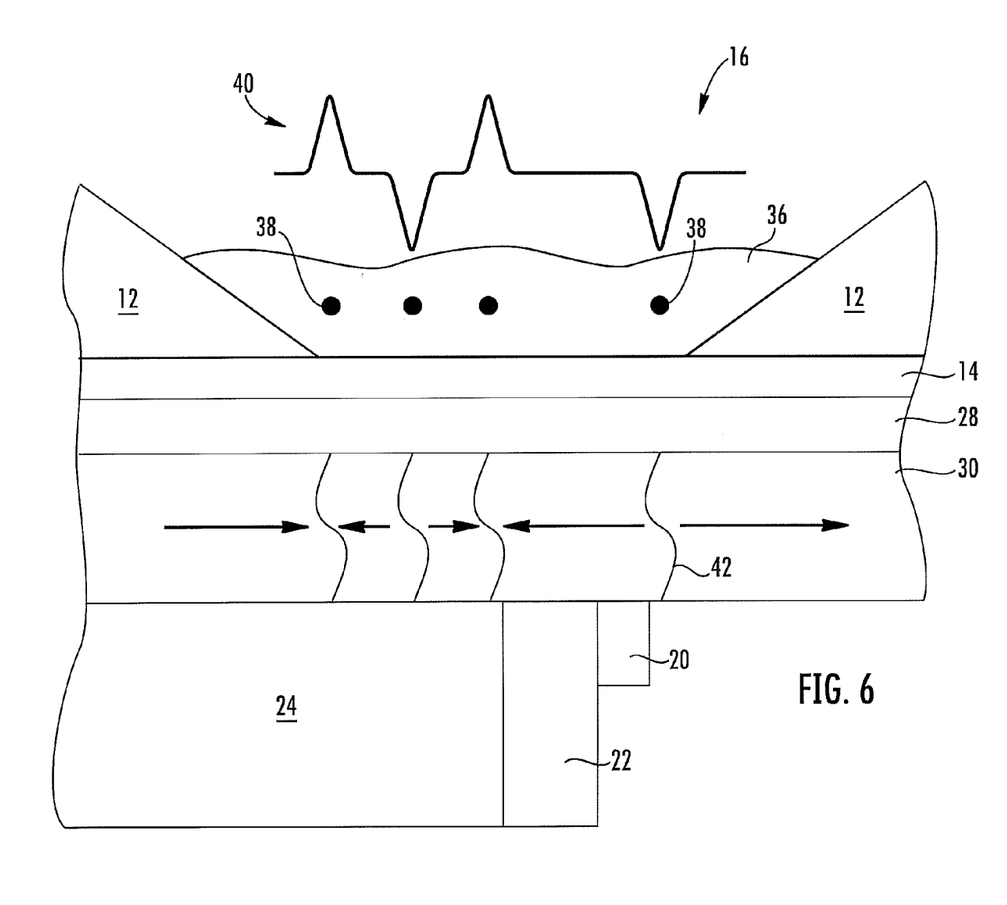
FIG. 6 shows the transitions as they would be written into the medium, the actual magnetic field profile, and the nanoparticles trapped by the stray fields of the magnetized medium.

FIG. 6 shows the transitions 42 as they would be written into the Cobalt alloy medium 30, the actual magnetic field profile 40, and the coated nanoparticles 38 trapped by the stray fields of the magnetized Co medium 30. It is important to note that the patterns may be written both prior to introducing the nanoparticle solution 36 or after, as necessary to achieve the desired pattern.

According to the present disclosure, any pattern may be written to achieve a desired magnetic field profile resulting in placement of the coated nanoparticles 38 in the polymeric solution 36 located in the well 16. Thus, a user can control the placement of the actual coated nanoparticles 38 in the polymeric solution 36. After the nanoparticles 38 have been positioned to their desired placement, the polymeric material can be cured to solidify or gel, effectively immobilizing the nanoparticles within the cured polymeric material. Thus, after the magnetic field profile is removed from the well 16, the nanoparticles are immobilized and trapped in place where the field retained them.

Immobilizing the Nanoparticles and Assembly of the Macroscale Device

Upon exposure to UV light, the curable polymeric material is polymerized, and the nanoparticles 38 are immobilized in the cured polymer in the positions where they were trapped via the stray magnetic fields emanating from the magnetically-recorded transitions.

The next step in the assembly process is to remove the cured polymer from the Si well and assemble it into a macroscale device. One method to assist in removing the cured membrane is the inclusion of a lubricant, for example, a trichlorosilane (R—$SiCl_3$) monolayer as a release layer to help with the removal of the patterned nanostructures. Such monolayers are depositable on SiN films and have thicknesses on the order of 2.3-2.5 nm, so there is a slight increase in the separation of the trapping field source from the nanoparticle, which can be offset by decreasing the membrane thickness itself. Other monolayers could also be employed as lubricant release layers.

Figure 7A:
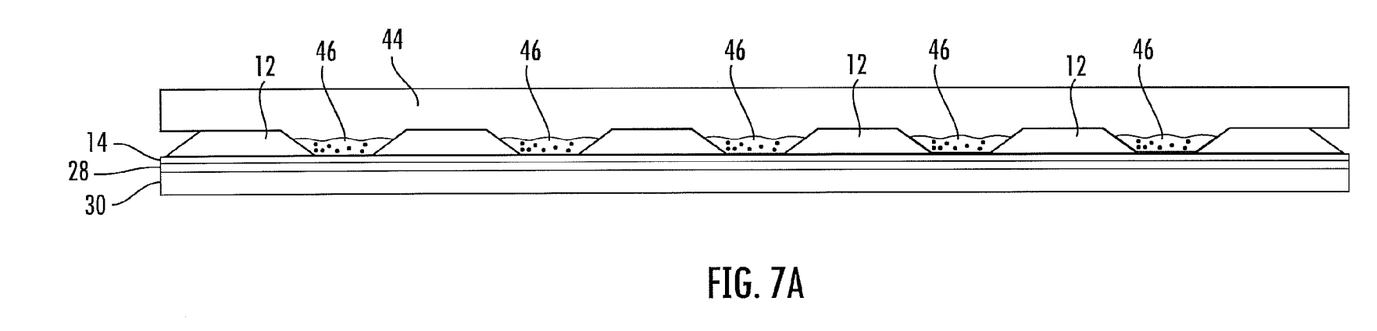
FIGS. 7A and 7B show a method of stamping pre-patterned assembled nanostructures onto the substrate.
Figure 7B:
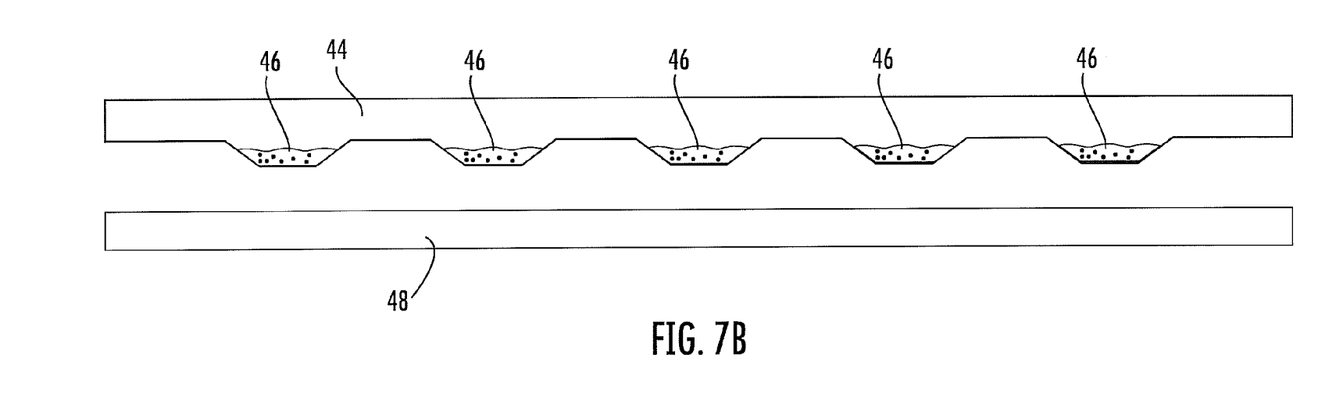

After curing the polymer to immobilize the nanostructures, a thick layer of poly(dimethylsiloxane) (PDMS) 44 can be coated over the structure such as shown in FIGS. 7A-7B. After curing this compliant polymer (silicone rubber), with a reversible connection to the cured nanostructures 46 layer 44, the PDMS is peeled off and transferred to the actual device substrate 48 where the pre-patterned and assembled nanostructures are stamped onto the substrate. Several cured nanostructures 46 can be aligned and assembled into 3D macro-structures comprised of controllably-programmed nanostructures. The surface free energies must be engineered to have different release energies such that the PDMS "handle" can remove the assembled nanostructure component from the nanoassembly tool, and transfer it to the final substrate, at which point the component is strongly bonded to the substrate such that it releases from the PDMS handle. This selective release technology is called decal transfer microlithography.

Those of ordinary skill in the art will understand that the method for assembly disclosed and described herein is meant only as an example of a possible way to take the immobilized structures and build them into a larger scale device and is not intended to limit the scope of the invention. Other methods that those skilled in the art could use to remove the assembled nanostructures from the template and build them into a larger device structure are within the scope of the present invention.

The invention claimed is:

1. A method of producing a nanoscale structure having substantially immobilized nanoparticles arranged at a predetermined patterned, the method comprising:
   placing a curable polymeric solution within a well defined on an etched surface of a wafer, wherein the curable polymeric solution comprises a curable polymeric material and a magnetically coated nanoparticle; wherein the well is positioned adjacent to an atomically-smooth medium;
   moving a recording head in a predetermined manner to produce a magnetic field profile that substantially immobilizes the magnetically coated nanoparticle within the curable polymeric solution in the well, wherein the recording head is positioned on an opposite surface of the wafer from the wells;
   curing the curable polymeric solution such that the magnetically coated nanoparticle remains substantially immobilized after the magnetic field profile is removed, and
   removing the cured polymeric solution including the substantially immobilized magnetically coated nanoparticle from the well.

2. The method as in claim 1, wherein the recording head is connected to a computer such that the recording head is controllable via a computer program.

3. The method as in claim 1, wherein the recording head comprises a transducer.

4. The method as in claim 1, wherein the curable polymeric solution further comprises a photoinitiator.

5. The method as in claim 4, wherein the curable polymeric material comprises a monomer that is polymerizable into a polymer.

6. The method as in claim 1, wherein the magnetically coated nanoparticle comprises a superparamagnetically coated nanoparticle.

7. The method as in claim 1, wherein the magnetically coated nanoparticle comprises magnetically coated gold nanoparticles.

8. The method as in claim 1, further comprising:
   stamping the cured polymeric solution including the substantially immobilized magnetically coated nanoparticle onto a device substrate.

9. The method as in claim 1, wherein the recording head is less than 25 nm from the curable polymeric solution within the well.

10. The method as in claim 1, wherein the recording head is less than 10 nm from the curable polymeric solution within the well.

11. A method of producing a nanoscale structure having substantially immobilized nanoparticles arranged at a predetermined patterned, the method comprising:
    mixing a curable polymeric material, a photoinitiator, and a magnetically coated nanoparticle to form a curable polymeric solution;
    dropping the curable polymeric solution into a well defined by a silicon wafer, wherein the well is positioned adjacent to an cobalt alloy medium;
    moving a transducer in a predetermined manner via a computer program to produce a magnetic field profile that substantially immobilizes the magnetically coated nanoparticle within the curable polymeric solution in the well, wherein the transducer is positioned on an opposite surface of the silicon wafer from the wells;
    applying ultra-violet light to the well to cure the curable polymeric solution such that the magnetically coated nanoparticle remains substantially immobilized after the magnetic field profile is removed, and
    removing the cured polymeric solution including the substantially immobilized magnetically coated nanoparticle from the well.

12. The method as in claim 11, wherein the well defines a base comprised of a silicon nitride membrane.

13. The method as in claim 12, wherein the transducer is located on a recording head, and wherein the recording head is in physical contact with the opposite side of the silicon wafer.

14. The method as in claim 11, wherein the curable polymeric material comprises a monomer that is polymerizable into the polymeric material.

15. The method as in claim 11, wherein the magnetically coated nanoparticle comprises a superparamagnetically coated nanoparticle.

16. The method as in claim 11, wherein the magnetically coated nanoparticle comprises magnetically coated gold nanoparticles.

17. The method as in claim 11, further comprising:
    stamping the cured polymeric solution including the substantially immobilized magnetically coated nanoparticle onto a device substrate.

* * * * *